United States Patent Office
3,822,255
Patented July 2, 1974

3,822,255
TETRAHYDRO - 1 - [(5 - NITROFURFURYLIDENE)
AMINO]SUBSTITUTED-2-(1H)-PYRIMIDINONES
Harry R. Snyder, Jr., Norwich, N.Y., assignor to Morton-Norwich Products, Inc.
No Drawing. Filed Jan. 12, 1973, Ser. No. 323,075
Int. Cl. C07d 51/36
U.S. Cl. 260—240 A                          1 Claim

ABSTRACT OF THE DISCLOSURE

The title compounds are useful as antibacterial agents and are adapted to be combined in various forms to provide compositions useful for combatting bacterial contamination.

---

This invention relates to chemical compounds. More particularly it is concerned with tetrahydro-1-[(5-nitrofurfurylidene)amino]substituted - 2 - (1H)-pyrimidinones of the formula:

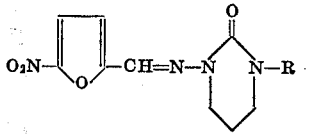

(I)

wherein R is 2-hydroxyethyl or 2-propynyl.

The compounds of formula (I) possess in vitro antibacterial activity as exemplified in the table herebelow:

| Bacterial species | A | B |
|---|---|---|
| Staphylococcus aureus | 6 | 25 |
| Diplococcus pneumoniae | 0.8 | 6 |
| Erysipelothrix rhusiopathiae | 25 | 3 |
| Streptococcus pyogenes | 12 | 3 |
| Escherichia coli | 3 | 6 |
| Salmonella typhosa | 6 | 12 |

NOTE.—A=1-[(5-Nitrofurfurylidene)amino]-3-(2-propynyl)tetrahydro-2-pyrimidinone; B=1-(2-Hydroxyethyl)-3-[(5-nitrofurfurylidene)amino]-tetrahydro-2-pyrimidinone.

The results set forth in the table above are secured in the commonly used serial dilution technique for determining in vitro antibacterial effects.

The antibacterial properties of the compounds of formula (I) make them useful as an active ingredient in various forms such as dusts, sprays, solutions, elixirs, unguents and the like to provide compositions designed to combat bacterial growth.

Upon peroral administration, as a suspension in sodium carboxymethylcellulose, to mice lethally infected with Staphylococcus aureus in a dose of about 83–110 mg./kg., the compounds of formula (I) prevent death in 50% of the animals.

The method employed in the preparation of the compounds of formula (I) is illustrated in the following examples:

EXAMPLE I

1-[(5-Nitrofurfurylidene)amino]-3-(2-propynyl)tetrahydro-2-pyrimidinone

A. 1-Benzylideneaminotetrahydro - 2 - pyrimidinone.—Tetrahydro-2-pyrimidone (200.0 g., 2.0 moles) was dissolved in 10% sulfuric acid (4000 ml.) and cooled to 4° C. Sodium nitrite (138.0 g., 2.0 moles) was added over a period of 20 minutes at >6° C. The mixture was stirred in an ice bath for 3 hours. Zinc dust (328 g.) was added in small portions over a period of an hour at >20° C. The mixture was stirred at room temperature for 1.25 hours. After filtering, the pH was adjusted to ca. 5 with sodium acetate. The solution was heated to 40° C. and benzaldehyde (190.8 g., 1.8 moles) in methanol (ca. 1500 ml.) was added. The cloudy solution was heated on the steam bath for an hour and cooled overnight. The product was collected and washed with water, then ether, and dried at 60° C. to yield 197.0 g. (53.7%), m.p. 175–179° C. This may be recrystallized from 2-propanol to yield m.p. 187–189° C.

Anal.—Calcd. for $C_{11}H_{13}N_3O$: C, 65.00; H, 6.45; N, 20.68. Found: C, 69.43; H, 6.42; N, 20.70.

B. 1-Benzylideneamino - 3 - (2-propynyl)tetrahydro-2-pyrimidinone.—1-Benzylideneaminotetrahydro - 2 - pyrimidinone (57.0 g., 0.25 mole) was dissolved in dimethylformamide (ca. 1500 ml.). The solution was stirred while sodium hydride, 56% oil dispersion, (12.0 g., 0.25 mole) was added. The mixture was stirred and heated at 90° C. for two hours. After cooling to ca. 50° C. propargyl bromide (30.0 g., 0.25 mole) was dissolved in some dimethylformamide was added. The mixture was stirred at 100° C. for ca. 18 hours.

The solvent was removed under reduced pressure. The residue was diluted with water and filtered to give a crude gummy material. This crude material was recrystallized from benzene to yield 39.0 g. (64.5%), m.p. 95–98° C.

C. 1-[(5-Nitrofurfurylidene)amino] - 3 - (2-propynyl)tetrahydro-2-pyrimidinone.—1-Benzylideneamino - 3 - (2-propynyl)tetrahydro-2-pyrimidinone (36.0 g., 0.15 mole) was dissolved in methanol containing some water. 5-Nitrofurfural (22.0 g., 0.15 mole) dissolved in some methanol was added together with a few drops of concentrated hydrochloric acid. The solution was heated on the steam bath for one hour. Upon cooling in an ice bath a yellow precipitate formed which was collected, washed with water, and dried at 65° C. to yield 36.1 g. (90.0%), m.p. 110–120° C. of crude material. The material was recrystallized from methanol to give 19.5 g., m.p. 145–147° C. (corr.).

Anal.—Calcd. for $C_{12}H_{12}N_4O_4$: C, 52.17; H, 4.38; N, 20.28. Found: C, 52.39, 52.42; H, 4.77, 4.79; N, 20.07, 20.08.

EXAMPLE II 1-(2-Hydroxyethyl)-3-[(5-nitrofurfurylidene)amino]tetrahydro-2-pyrimidinone A. 1-(2-Hydroxyethyl)tetrahydro - 2 - pyrimidinone.—1,3-Diamino-N-hydroxyethylpropane (100 g., 0.846 mole) was put into a flask together with urea (51 g., 0.846 mole). The mixture was gradually heated, with stirring, over a 3.5 hour period to a temperature of 230° C. The product, which did not crystallize upon cooling, was slurried with benzene, after which a crystalline material was isolated. The solid was dried at room temperature to yield 97 g. (79.6%) of product. The material was used without further purification.

B. 1-(2-Hydroxyethyl) - 3 - [(5-nitrofurfurylidene)amino]tetrahydro-2-pyrimidinone.—The pyrimidinone of A (97 g., 0.67 mole) was dissolved in 2000 ml. of 10% sulfuric acid and cooled to 5° C. Sodium nitrite (46 g., 0.67 mole) was added, with stirring, at such a rate as to maintain a temperature of 5° C. After stirring at 0–6° C. for 2 hours, zinc dust (107 g., 1.64 moles) was added at such a rate as to keep the temperature 20° C. The mixture was stirred without cooling for 2 hours. The mixture was filtered, and the filtrate was treated with 5-nitrofurfural (84 g., 0.6 mole) dissolved in ethanol. The solution was heated on the steam bath for 2 hours and then cooled. The solution stood at room temperature overnight, after which it was concentrated under reduced pressure. The residue was extracted with hot nitromethane. The nitromethane extract was cooled and diluted with ether. While cooling and scratching the side of the flask with a glass stirring rod, the product precipitated. The solid was filtered and dried at 65° to yield 46 g. (36.8%), m.p. ca. 175° C. This may be recrystallized from methanol-ether to yield m.p. 184–186° C.

Anal.—Calcd. for $C_{11}H_{14}N_4O_5$: C, 46.81; H, 5.00; N, 19.85. Found: C, 46.53, 46.54; H, 5.10, 5.18; N, 19.48, 19.63.

What is claimed is:
1. The compound 1-[(5-nitrofurfurylidene)amino]-3-(2-propynyl)tetrahydro-2-pyrimidinone.

References Cited
UNITED STATES PATENTS

| | | | |
|---|---|---|---|
| 3,001,992 | 9/1961 | Ballamy et al. | 260—240 A |
| 3,157,645 | 11/1964 | Spencer | 260—240 A |
| 3,254,075 | 5/1966 | Ebetino | 260—240 A |

JOHN D. RANDOLPH, Primary Examiner

U.S. Cl. X.R.
424—251; 260—240 G